United States Patent

Wilkinson

[15] 3,679,965
[45] July 25, 1972

[54] POWER SUPPLY VOLTAGE OUTPUT DETECTOR

[72] Inventor: Bruce L. Wilkinson, Torrance, Calif.
[73] Assignee: Pioneer Magnetics, Inc., Santa Monica, Calif.
[22] Filed: Feb. 25, 1971
[21] Appl. No.: 118,656

[52] U.S. Cl. ..........................323/19, 317/31, 317/33 VR, 340/248 A
[51] Int. Cl. .....................................G05f 1/48, G08b 29/00
[58] Field of Search ..................317/31, 33 R, 33 SK, 33 UR; 323/19, 22 T; 340/248 A, 248 C

[56] References Cited

UNITED STATES PATENTS

| | | |
|---|---|---|
| 3,584,259 | 6/1971 | Traub et al.............................317/33 R |
| 3,599,042 | 10/1971 | Andrews, Jr. .........................317/33 R |
| 3,586,975 | 6/1971 | Coylson ..............................340/248 C |
| 3,098,999 | 7/1963 | Clapper ...............................340/248 A |
| 3,225,257 | 12/1965 | Fegley...................................317/33 R |
| 3,354,448 | 11/1967 | Brolin ..................................340/248 C |
| 3,534,353 | 10/1970 | Calkin et al..........................340/248 A |

Primary Examiner—A. D. Pellinen
Attorney—Jessup & Beecher

[57] ABSTRACT

A circuit for use in conjunction with a power supply and which provides a first signal amplitude (e.g., logical "1") when the voltage output from the power supply is at or above its proper value, and which provides a second signal amplitude (e.g., logical "0") when the power supply voltage is below its proper value.

4 Claims, 1 Drawing Figure

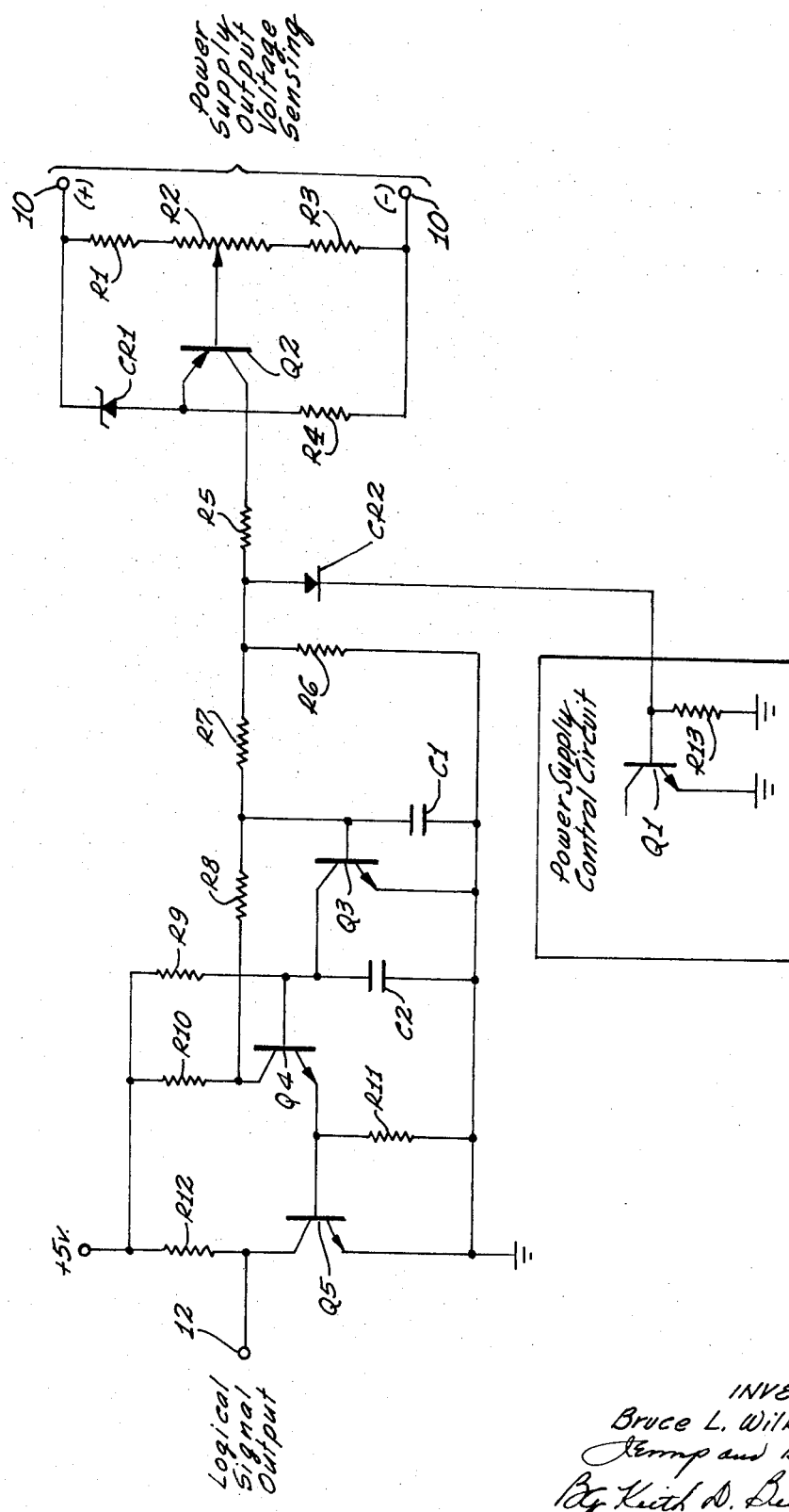

POWER SUPPLY VOLTAGE OUTPUT DETECTOR

BACKGROUND OF THE INVENTION

In power supplies which are used to energize computers, and other electronic equipment, it is frequently necessary to provide a signal which indicates whether or not the output voltage of the power supply is at its proper level for normal system operation. For Example, it is sometimes necessary to inhibit computer operations when the power supply is first turned on and is below normal operating level, and to maintain the computer operations inhibited until all of the power supply voltages have stabilized at their normal levels. In the prior art systems, this function was performed by providing a comparator circuit which compared the power supply output voltages with a fixed reference. However, such a comparator circuit is relatively complex, and it usually requires somewhat complicated and precise adjustments.

The detector circuit of the present invention is extremely simple and yet is capable of performing all the functions of the complicated prior art circuit described in the preceding paragraph. The circuit of the invention responds to the output voltage level of the power supply to provide a first signal amplitude output (logical "0") when the power supply output voltage is below its normal threshold, and to provide a second signal amplitude (logical "1") when the power supply output voltage is at or above its normal level. The circuit of the invention is advantageous in that it is simple, and since it requires no external reference, and no adjustments are needed.

The circuit of the invention finds particular utility in the type of power supplies described in copending application Ser. No. 58,042, which was filed July 24, 1970, entitled "Power Supply," and which operate in a switching mode. However, it will become evident as the description proceeds, that the circuit of the invention may be used in conjunction with the linear, series regulated type power supplies, and the like.

BRIEF DESCRIPTION OF THE DRAWING

The single FIGURE illustrates a detector circuit constructed in accordance with one embodiment of the invention, and it also shows portions of the circuitry of a power supply to which the detector circuit is coupled.

DETAILED DESCRIPTION OF THE ILLUSTRATED EMBODIMENT

The power supply to which the detector circuit is connected comprises, for example, a pair of output terminals 10 across which a regulated direct current output voltage appears. A pair of resistors R1 and R3, and a potentiometer R2 are series connected across the output terminals 10. The resistors R1 and R3 may have a resistance, for example, of 390 ohms, and the potentiometer R2 may have a resistance of 250 ohms.

The movable element of the potentiometer R2 is connected to the base of a PNP transistor Q2 which is connected as a preamplifier. The emitter of the transistor Q2 is connected through a Zener diode CR1 to the positive terminal 10 and through a resistor R4 to the negative terminal 10. The Zener diode CR1 may be of the type designated 1N753, and the resistor R4 may have a resistance of 470 ohms.

The collector of the transistor Q2 is connected through a limiting resistor R5 and through a diode CR2 to the base of a transistor Q1 which, in the switching type of power supply such as described in the aforesaid copending application, controls the operation of the power supply. The base of the transistor Q1 is connected to a grounded resistor R13. The resistor R13 may have a resistance of 3.3 kilo ohms. The transistor Q1 may be of the type designated 2N5172.

The design of the power supply is such that the flow of current from the input source to the regulated output is controlled by the transistor Q1, as described in the aforesaid copending application. When the transistor Q1 is non-conductive, current is permitted to flow from the source to the regulated output, and when the transistor Q1 is conductive, the flow of current is inhibited. The action of the transistor Q1 may be proportional or switching. That is, regulation may be accomplished by allowing the transistor Q1 to conduct just enough current to restrict the current flow to the output to the exact amount needed to maintain the output voltage at the desired regulated level. The conduction of the transistor Q1 varies as the current demand of the output varies. Alternately, the transistor Q1 may be operated by allowing pulses of current to pass from the source to the output when the transistor Q1 is non-conductive, and by inhibiting the passage of such pulses when the transistor Q1 is conductive.

In the latter type of system, the transistor Q1 is either in a saturated conductive condition, or is non-conductive. When the output voltage of the power supply falls below the desired regulated level, the transistor Q1 become non-conductive, and permits a pulse of current to flow to the output. This pulse raises the output voltage slightly above the desired level, and the transistor Q1 is again rendered conductive. When the output again falls below the desired regulated level, the transistor Q1 is again rendered non-conductive and it permits another current pulse to flow. In this way, the transistor Q1 is turned off when the output is below the desired level, and is turned on and off continuously to maintain the power supply output voltage at the desired normal regulated value.

The aforesaid power supply is described in detail in the copending application, and a more complete description thereof is believed to be unnecessary for the purposes of the present invention.

The control of the transistor Q1 is accomplished, either in the proportional mode or in the switching mode, by the preamplifier circuit of the transistor Q2. In the preamplifier circuit, the resistor R4 provides a current bias for the Zener diode CR1. The transistor Q2 compares the output of the voltage divider formed by the resistors R1 and R3 and potentiometer R2, with the Zener reference. When the power supply output voltage is at the desired regulated level, the transistor Q2 is on the verge of conduction. When the output voltage rises above the desired regulated value, the voltage across the resistors R1 and R2 increases, causing base current to flow from the transistor Q2. The resulting conduction of the transistor Q2 causes current flow from its collector through the resistor R5 and through the diode CR2 into the base of the transistor Q1, causing the transistor Q1 to become conductive.

On the other hand, when the power supply output voltage falls below the regulated level, the voltage across the resistors R1 and R2 decreases, producing a reverse bias on the base of the transistor Q2, rendering the transistor Q2 non-conductive. When the transistor Q2 is turned off, the transistor Q1 is deprived of base current and it is rendered non-conductive. The resistor R5 serves to limit the collector current of the transistor Q2 so as to prevent damage to the transistor Q2 should the output voltage of the power supply rise above the regulated level sufficiently to cause heavy conduction in the transistor Q2.

In the system illustrated in the drawing, the detector circuit of the invention is connected to the preamplifier circuit of the transistor Q2, and it serves to produce a first output corresponding, for example, to logic "0" when the indication is that the power supply voltage output is below the regulated value, and the detector circuit provides an output corresponding to logical "1, " when the power supply voltage is at or above the regulated level. The logical signal output from the detector circuit may be used, for example, in computers, and the like, to inhibit operation of the computer until the voltage output of the power supply reaches the normal regulated level.

The regulation detector comprises a resistor R7 and a grounded resistor R6, the junction of which is connected to the junction of the resistor R5 and diode CR2. The value of the resistor R6 may be 10 kilo-ohms, and the value of the resistor R7 may be 2.7 kilo-ohms. The resistor R7 is connected to a further 100 kilo-ohm resistor R8, and to the base of an NPN transistor Q3. The transistor Q3 may be of the type designated 2N5172. The emitter of the transistor Q3 is grounded, and the base is connected to a grounded capacitor C1. The capacitor C1 may have a capacity, for example, of 1,000 picofarads.

The collector of the transistor Q3 is connected to a grounded 0.1 microfarad capacitor C2, and to the base of a similar NPN transistor Q4. The collector of the transistor Q3 is connected to a resistor R9, and the collector of the transistor Q4 is connected to a resistor R10 and to the resistor R8. The resistor R9 may have a resistance of 470 ohms, and the resistor R10 may have a resistance of 47 ohms. Both these resistors are connected to the positive terminal of a 5 volt unidirectional voltage source.

The emitter of the transistor Q4 is connected to the base of an NPN transistor Q5 and to a grounded 330 ohm resistor R11. The transistor Q5 may be of the type designated 2N4921. The emitter of the transistor Q5 is grounded, and the collector is connected to the positive 5 volt terminal through a 100 ohm resistor R12. The logical signal output is derived at an output terminal 12 connected to the collector of the transistor Q5.

When the power supply output is below the predetermined regulated level, so that the transistor Q2 is non-conductive, there is insufficient base current available for the transistor Q3, so that the transistor Q3 is also non-conductive. The resistor R9 provides the base current for the transistor Q4, thereby causing the latter transistor to be conductive. Therefore, current flows through the resistor R10, through the transistor Q4, and into the base of the transistor Q5, so that, under these conditions, the transistor Q5 is in a saturated conductive condition. This provides a nearly zero volt logic output at the output terminal 12, representing logical "0," and indicating that the power supply output is below the regulated level. As mentioned above, the logical output at the terminal 12 may be used to control the equipment energized by the power supply, so that the equipment is activated only when the power supply voltage rises to the predetermined regulated level.

When the power supply output rises to that level, the transistor Q2 becomes conductive, and current from the collector of the transistor Q2 flows through the resistor R7 into the base of the transistor Q3, as well as through the diode CR2 into the base of the transistor Q1. This current causes the transistor Q3 to become conductive, which causes the current through the resistor R9 to flow through the transistor Q3 instead of into the base of the transistor Q4. Therefore, the transistor Q4 is deprived of base current, and it becomes non-conductive. When the transistor Q4 becomes non-conductive, the transistor Q5 is deprived of base current and it also becomes non-conductive. The output appearing at the terminal 12 is then approximately +5 volts, representing logical "1," and this indicates that the power supply output is at or above the regulated level.

If the transistor Q2 again becomes non-conductive, causing the transistor Q3 to become non-conductive, a time interval is required before the logic output will switch. This is because the current through the resistor R9 flows into the capacitor C2, causing the capacitor C2 to charge to a voltage equal to the sum of the base-emitter voltage of the transistors Q5 and Q4. Since the transistor Q3 can discharge the capacitor C2 in a time short as compared with the charging time through the resistor R9, the logical output will remain in the logical "1" state continuously even though the transistors Q2 and Q1 are being caused to be conductive and non-conductive as the regulation is maintained. The logical "1" state will continue unless the transistor Q2 becomes non-conductive for a period exceeding the normal operating period. Also, because slightly less voltage is required across the resistor R7 to render the transistor Q3 conductive, than is required across the diode CR2 to produce any conduction in the transistor Q1, the logic output will be in the logical "1" state whenever Q1 is conducting, in the proportional type of system.

The resistor R8 provides positive feedback from the collector of the transistor Q4 to the base of the transistor Q3 to assure rapid switching and to prevent partial switching due to electrical noise. Capacitor C1 also prevents undesired switching due to narrow noise pulses, this being achieved by filtering the input to the transistor Q3.

The invention provides, therefore, a regulation detection circuit which provides a first logical output when the voltage output of a power supply is below the predetermined regulated level, and which provides a second logical output when the voltage output of the power supply is at or above the regulated level.

It will be appreciated that while a particular embodiment of the invention has been shown and described, modifications may be made. It is intended in the following claims to cover all modifications which come within the spirit and scope of the invention.

What is claimed is:

1. In combination with a power supply which produces a unidirectional voltage output, and which includes an output voltage sensing circuit, a power supply control circuit connected to the output of said sensing circuit for regulating said voltage output at a predetermined threshold level, a regulation detector circuit connected to the output of said voltage sensing circuit for producing a first logical output when said unidirectional voltage output from said power supply is below a predetermined level, and producing a second logical output when said power supply unidirectional voltage is above said threshold level, said regulation detector circuit comprising: an input circuit connected to the output of said voltage sensing circuit for sensing the level of the unidirectional voltage output therefrom; a first transistor having a base electrode connected to said input circuit, and having an emitter electrode connected to a point of reference potential, said first transistor assuming a first state when said unidirectional voltage output is above a predetermined level and assuming a second state when said unidirectional voltage output is below said predetermined level; a second transistor having a base electrode connected to the collector electrode of said first transistor; an output circuit including a third transistor having a base electrode connected to the emitter electrode of said second transistor to assume a saturated state of conductivity when said first transistor is in one of its aforesaid states and to assume a non-conductive state when said first transistor is in the other of its aforesaid states; and a circuit including a resistor connected to a source of unidirectional potential and a capacitor connected to said resistor and to said point of reference potential, the common junction of said resistor and capacitor being connected to said collector electrode of said first transistor and to said base electrode of said second transistor for providing a delay in the transition of said third transistor between its aforesaid states as said unidirectional voltage output drops below the predetermined level.

2. The combination defined in claim 1, in which said input circuit includes a resistance network to cause said first transistor to assume its first state at a level of said unidirectional voltage output slightly above the aforesaid predetermined level.

3. The combination defined in claim 1, and which includes a positive feedback network connected between said output circuit and said input circuit to increase the switching rate of said second transistor as said unidirectional voltage output rises above said predetermined level.

4. The combination defined in claim 1, in which said input circuit includes a filter network to render the detector circuit unresponsive to narrow noise pulses.

* * * * *